United States Patent
Hong et al.

(10) Patent No.: US 10,777,376 B2
(45) Date of Patent: Sep. 15, 2020

(54) METHOD AND SYSTEM FOR HARDWARE TAMPER DETECTION AND MITIGATION FOR SOLID STATE CIRCUIT BREAKER AND ITS CONTROLLER

(71) Applicant: ABB Schweiz AG, Baden (CH)

(72) Inventors: Junho Hong, Cary, NC (US); Kee Ho Shin, Morrisville, NC (US)

(73) Assignee: ABB Schweiz AG, Baden (CH)

( * ) Notice: Subject to any disclaimer, the term of this patent is extended or adjusted under 35 U.S.C. 154(b) by 187 days.

(21) Appl. No.: 15/605,039

(22) Filed: May 25, 2017

(65) Prior Publication Data
US 2018/0342360 A1 Nov. 29, 2018

(51) Int. Cl.
*H01H 9/54* (2006.01)
*H01H 71/04* (2006.01)
*H01H 71/74* (2006.01)
*H01H 9/16* (2006.01)

(52) U.S. Cl.
CPC ............ *H01H 71/04* (2013.01); *H01H 9/167* (2013.01); *H01H 9/168* (2013.01); *H01H 2071/7472* (2013.01); *H01H 2300/03* (2013.01)

(58) Field of Classification Search
CPC ................................ H01H 9/54; H01H 89/00
See application file for complete search history.

(56) References Cited

U.S. PATENT DOCUMENTS

| | | | |
|---|---|---|---|
| 3,668,483 A | 6/1972 | Kellenbenz | |
| 5,682,949 A | 11/1997 | Ratcliffe et al. | |
| 7,081,815 B2 | 7/2006 | Runyon et al. | |
| 7,342,474 B2 | 3/2008 | Castonguay et al. | |
| 8,773,827 B2 | 7/2014 | Kiko | |
| 8,823,534 B2 | 9/2014 | Kuystermans | |
| 9,312,698 B2 | 4/2016 | Subbotin et al. | |
| 10,141,128 B1 * | 11/2018 | Zhou ..................... | H01H 9/181 |
| 2004/0082203 A1 | 4/2004 | Logvinov et al. | |

(Continued)

OTHER PUBLICATIONS

Computerworld Article, by Darlene Storm; http://www.computerworld.com/article/2476599/cybercrime-hacking/black-hat-nest-thermostat-turned-into-a-smart-spy-in-15-seconds.html: "Black Hat: Nest Thermostat turned into a Smart Spy in 15 seconds"; pp. 1-4; Aug. 11, 2014.

*Primary Examiner* — Jared Fureman
*Assistant Examiner* — Emmanuel Dominique
(74) *Attorney, Agent, or Firm* — Taft Stettinius & Hollister LLP; J. Bruce Schelkopf

(57) ABSTRACT

A system and method for hardware tamper detection and mitigation for a circuit breaker. The method includes detecting and mitigating a breach to a circuit breaker of an electrical power management system, wherein the circuit breaker includes a housing, an electrical circuit, and switch coupled to and controllable by the electrical circuit. An alert identifying a detected breach event at the circuit breaker is generated and transmitted to a computing device. The circuit breaker device experiencing the detected breach event is disabled in response to the alert. An electrical power management system includes a plurality of circuit breakers each having a breach detector coupled to an electrical circuit, and a switch coupled to and controllable by the electrical circuit. A circuit breaker controller controls the state of the circuit breaker as determined by the breach detector.

24 Claims, 3 Drawing Sheets

(56) References Cited

U.S. PATENT DOCUMENTS

| | | |
|---|---|---|
| 2006/0049694 A1* | 3/2006 | Kates .................. H02J 13/0075 307/132 E |
| 2008/0204272 A1 | 8/2008 | Ehrke et al. |
| 2011/0109301 A1* | 5/2011 | Johnson .................... G01R 1/22 324/119 |
| 2012/0032519 A1* | 2/2012 | Watts ........................ H02J 3/46 307/99 |
| 2012/0218676 A1 | 8/2012 | Demetriades et al. |
| 2013/0090748 A1* | 4/2013 | LaFrance ................. H01H 9/54 700/67 |
| 2014/0277761 A1 | 9/2014 | Matsuoka et al. |
| 2014/0277763 A1 | 9/2014 | Ramachandran et al. |
| 2015/0057822 A1 | 2/2015 | Baldridge |
| 2015/0109077 A1* | 4/2015 | Tomimbang ......... H02H 1/0015 335/7 |
| 2016/0225562 A1* | 8/2016 | Franks ..................... H02H 3/08 |
| 2019/0172189 A1* | 6/2019 | Pop ........................ G08B 21/18 |

\* cited by examiner

METHOD AND SYSTEM FOR HARDWARE TAMPER DETECTION AND MITIGATION FOR SOLID STATE CIRCUIT BREAKER AND ITS CONTROLLER

TECHNICAL FIELD

The present disclosure relates circuit breakers, and more particularly, to the detection and the mitigation of consequences resulting from the tampering of a circuit breaker.

BACKGROUND

Circuit breakers include purely mechanically controlled circuit breakers, purely electrically controlled circuit breakers, and a combination of mechanically and electrically controlled circuit breakers. A solid state circuit breaker (SSCB) includes certain benefits, including being free from arching and switch bounce, faster switching time, greater reliability, and a longer product life time. Moreover, the SSCB can be equipped with wired and/or wireless communications for determining circuit breaker conditions and with control circuitry to open or to close the circuit breaker in response to the wired or wireless communication.

The SSCB can be located in a building or other facility or a power grid to control the supply of power delivered from an AC or DC supply to a load or to multiple loads. If used in a building, for instance, one SSCB can be used to control the power supplied to the entire building and additional SSCBs can be used to control the power delivered to different portions of the building. In addition, the power delivered to each floor can be controlled by a different SSCB. Likewise, the power to each floor can be further controlled by additional SSCBs to control power delivered to different areas of a floor.

Because the SSCB includes control circuitry which enables electronic control of individual SSCBs, it is important to insure that the SSCB is not tampered with nor is turned on or off by an unauthorized individual or entity. Consequently, there is a need for reducing or preventing tampering with or the destruction of a solid state circuit breaker.

In addition, there is a significant need for the unique apparatuses, methods, systems and techniques disclosed herein.

SUMMARY

Exemplary embodiments include unique systems, methods, techniques and apparatuses for detecting and mitigating the results of a breach to an electrical power distribution system having circuit breakers. Further embodiments, forms, objects, features, advantages, aspects and benefits of the disclosure shall become apparent from the following description and drawings.

The disclosed embodiments include a method and system to send an alert or warning of an unauthorized attempt to access a remote controllable circuit breaker, including an SSCB, which is remotely controllable. In different embodiments, the SSCB includes integrated remotely controllable functionality. In still other embodiments, the SCCB is remotely controlled by an external device. Detailed physical security logs are generated and provide to the user a situational awareness of the operation of the RCCBs and the systems in which the RCCBs operate. The disclosed embodiments are applicable to any type circuit breaker, including SSCBs that are equipped with a communication link to a computing device, including computing devices accessible through the internet. A detection system sends a warning signal to the user when there is a detected security breach, as well as provides a proactive mitigation scheme to disable the remote access connection to the RCCB and restrict the RCCBs to a local control mode only.

Physical security of RCCBs and associated controllers is improved by detecting malicious physical activity to open the product housing or case, as well as detecting the abnormal hardware tampering attack. A remote access connection is severed upon detection of unauthorized physical attacks or attempts, which can prevent a worst case scenario, such as opening all RCCBs in the system being targeted by an attacker. In different embodiments, collaboration between intrusion detection and/or anomaly detection system differentiates between a security warning caused by a malicious attack versus natural disaster. The security logs provide a history of the RCCB devices regarding the physical security that enables a user to analyze the security events.

In one embodiment, there is provided a method of detecting and mitigating a breach to a circuit breaker device having a housing or case, an electrical circuit, and a switch coupled to and controllable by the electrical circuit. The method includes: detecting a breach event made to one of the housing, the electrical circuit, and the switch of the circuit breaker device; generating an alert identifying the detected breach; transmitting the alert to a computing device; and responding to the transmitted alert by changing a stated of the circuit breaker device.

In another embodiment, there is provided a method of detecting and mitigating a breach to one of a plurality of a circuit breaker devices of an electrical power management system, wherein each of the plurality of circuit breaker devices includes a housing, an electrical circuit, and a switch coupled to and controllable by the electrical circuit. The method includes: detecting a breach event made to one of the plurality of circuit breaker devices, wherein the breach event is made to one of the housing, the electrical circuit, and the switch of the circuit breaker device; generating an alert identifying the one of the plurality of circuit breaker devices experiencing the detected breach event; transmitting the generated alert by a wireless communication link to a computing device; and disabling the one of the plurality of circuit breaker devices experiencing the detected breach event.

In still another embodiment there is provided an electrical power management system including a plurality of circuit breakers, wherein each of the circuit breakers includes a housing, an electrical circuit, a breach detector coupled to the electrical circuit, and a switch coupled to and controllable by the electrical circuit. A communication line is operatively connected to each of the electrical circuits and to each of the plurality of circuit breakers. A circuit breaker controller is operatively connected to the communication line. A network communication router is operatively connected to the communication line and is adapted to communicate with an internet based computing service.

DETAILED DESCRIPTION OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

Figure 1:
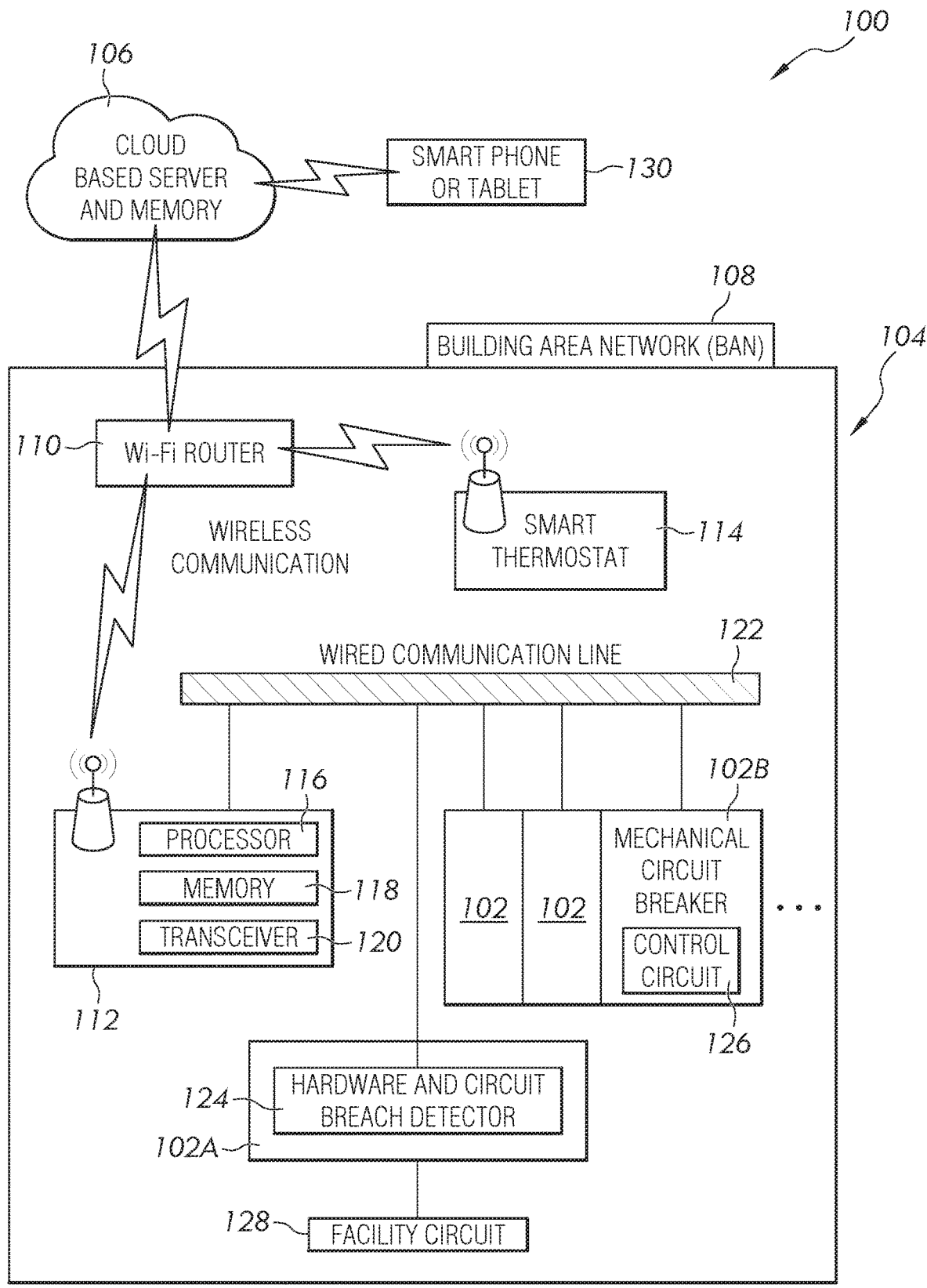
FIG. 1 illustrates a schematic block diagram of an electrical power management system having tamper detection and mitigation for resolving a breach to one or more circuit breakers.

FIG. 1 illustrates a schematic block diagram of an electrical power management system 100 having tamper detection and mitigation for resolving a breach to one or more circuit breakers 102 located at a facility 104. The power management system 100 is located with a power distribution system that distributes power from a source of power to a user of power at a facility, including but not limited to a building, a school, factory, or power grid. The delivery of power to the facility 104 is not illustrated, but is known by those skilled in the art. The power distribution system includes one or more of the circuit breakers 102, each of which controls the delivery of power to the entire facility or to a portion of the facility. For instance in one embodiment, one circuit breaker 102 is used to control the distribution of power to an entire facility. In another embodiment, one circuit breaker 102, a master circuit breaker, controls the power delivered to a plurality of circuit breakers 102, each of which individually controls the distribution of power to a portion of the facility, for instance a floor. In still another embodiment as illustrated in FIG. 1, each circuit breaker 102 is assigned to control the distribution of power to a portion of the facility without the use of a master circuit breaker. Each of the circuit breakers 102 is structured to selectively disrupt the flow of electrical current in response to detecting a fault condition. When circuit breaker is closed, electrical current can flow through the circuit breaker to deliver current to the facility. When the circuit breaker is open, electrical current cannot flow through the circuit breaker and consequently the current no longer flows to the designated circuit.

In one embodiment, each of the circuit breakers 102 is solid state circuit breaker that includes certain benefits when compared to a mechanical circuit breaker including being free from arching and switch bounce, which provides fast switching time, higher reliability, and longer life time to the customers. Moreover, the RCCB is equipped with a wireless and/or wired communication link for measurements and controls to open or close the RCCB, since the RCCB can include a controller, such as an internally located processor or microprocessor. Due to the control and communications capability, the RCCB is enabled to be what is known as "smart device" which provides certain benefits to the customers, such as remote monitoring of electricity usages, and remote on or off controls for the appliances via wireless communication. Even though the capability of such RCCB is enhanced, cyber and physical security issues can result from the additional features. These issues have been recognized and certain government agencies have published cyber and physical security related guidelines and standards. Consequently, protection of communications and detection of any abnormal or malicious behaviors to such internet enabled RCCBs are important. The described detection and mitigation methods and systems enable customers or other entities to be notified when an RCCB has been tampered with or when there are attempts to compromise the electrical hardware of the RCCB including the control hardware have been made.

The power management system 100 provides for control of each of the circuit breakers 102 through the use of cloud based communication which includes a "cloud" based server 106, having an internal or external memory. In this embodiment, the "cloud" is generally defined as the storing and accessing data and programs over the Internet instead of, or in combination with, using a computer's hard drive or memory located at a facility at which the circuit breakers 102 are located or elsewhere. The cloud server 106 is operatively connected to a building area network 108, as is known by those skilled in the art. In the illustrated embodiment, a router 110 connects the communication network of the facility 104 with the cloud server 106. The router 110, in different embodiments is one of a broadband router, a hardwired router, and a wireless router. In the illustrated embodiment, the router 110 is wireless Wi-Fi router configured to communicate with a circuit breaker controller 112 and a smart thermostat 114. The smart thermostat 114 is representative of one type of controllable device located in the facility 110. Such controllable devices have functions that can be monitored and controlled through wired or wireless communication received from the router 110. Other smart devices include, for instance, lights, motion detectors, door locks, and kitchen appliances.

The controller 112 includes a processor 116, a memory 118, and a transceiver 120. The processor 116, in different embodiments, is a programmable type, a dedicated, hardwired state machine, or a combination of these, and can further include multiple processors, Arithmetic-Logic Units (ALUs), Central Processing Units (CPUs), Digital Signal Processors (DSPs) or the like. Other forms of processor 116 include multiple processing units, distributed, pipelined, and/or parallel processing devices. In the illustrated embodiment, the processor 116 is a programmable variety that executes algorithms and processes data in accordance with defined by programmed instructions (such as software or firmware) stored in the memory 118. The operating logic for processor 116, in different embodiments, is at least partially defined by hardwired logic or other hardware.

The memory 118 includes one or more types, such as a solid-state variety, electromagnetic variety, optical variety, or a combination of these forms. Furthermore, the memory 118 includes, in different embodiments, volatile, nonvolatile, or a combination of these types, and a portable variety, such as a disk, tape, memory stick, cartridge, or the like. The memory 118 is configured to store data that is manipulated by the operating logic of the processor 116.

In the illustrated embodiment, the controller 112 is operatively connected to each of the circuit breakers 102 through a wired communication line 122. Each of the circuit breakers 102 is hardwired to the line 122 as is understood by those skilled in the art. Each of the circuit breakers, in different embodiments, is of the same type or is of a different type. Each of the circuit breakers, however, includes hardware and a circuit breach detector 124 as is illustrated for the circuit breaker 102A. Each of the circuit breakers 102 includes the hardware and circuit breach detector 124. In addition, the controller 112 is configured to send an open/close signal to RCCB or to a status of a current condition of the RCCB for monitoring and advanced control purposes (e.g., send measurements to smart thermostat for advanced load controls). In other embodiments, each of the circuit breakers 102 includes a controller.

In FIG. 1, the circuit breaker 102A is a solid state circuit breaker including the hardware and circuit breach detector 124. The breach detector 124, in different embodiments, includes a sensor located at the housing to detect whether the housing in tampered with in any fashion. For instance, the sensor can detect an opening of an access door of the housing or other unauthorized entry into the housing. Other sensors include, but are not limited to contacts between housing and main body of the circuit breaker, pressure switches or a programmable microchip. The sensors are configured to detect abnormal behaviors occurring at the circuit breaker.

The circuit breaker and controller, in different embodiments, include a function to detect for breach attempts made to a circuit board of the device. For instance, hidden tamper-detection traces or sensors are located in internal layers on the printed circuit board. The main purpose is to detect any unauthorized physical or electronic tampering against the hardware product. Additionally, sensors are provided in different embodiments to detect an operational or environmental change, e.g., radiation, voltage and temperature. For instance, attackers may want to use an x-ray device in order to see the inside a sealed device, or may generate heat to install a new chipset on the main board, or increase or decrease the internal voltage after change the hardware logics for intrusions.

Consequently, any type of sensor or sensor system which generates an alert indicating unauthorized entry into the housing or a tampering with the hardware or electronic circuitry of the circuit breaker 102 is included in the present disclosure.

The breach detector 124 in other embodiments includes electrical circuitry to detect an unauthorized attempt to insert malicious software codes, such as malware, into the controller 112 of controller located in the RCCB itself that includes bypassing normal monitoring and operation. Once an RCCB or its controller has been compromised, software instructions and data (the malware) can be embedded into the RCCB which can fabricate false measurements or control signals. In a worst case scenario, all the loads in a target area can be shut off by manipulation of the state of the RCCB, resulting with power outages within a facility of even larger power outages to multiple homes or buildings at the same time.

Circuit breaker 102B in another embodiment includes a conventional mechanical circuit breaker having a mechanical switch, which moves from one state to another state as a result of experiencing an overcurrent condition. The conventional circuit breaker provides over current protection by mechanical force generated by a solenoid. When the over current flows, the over current energizes the solenoid and then the excited solenoid pushes the mechanical switch to make open circuit. In these embodiments, additional circuitry and control circuitry is included such that the conventional circuit breaker is controllable by a communication signal.

If a mechanical switch is present, the circuit breaker 102B also includes a control circuit 126, which provides status of the circuit breaker 102B as well as providing operational control of the mechanical switch. For instance, the control circuit 126 includes, in different embodiments, processor controlled circuitry, integrated circuits, and discrete components. In one embodiment, the control circuit includes an electronic switch, which in different states either removes or places the mechanical switch in or out of the power distribution system. In other embodiments, the circuit breakers 102 include combinations of both solid stated circuit breaker circuitry and mechanical circuitry. In still another embodiment, the solid state circuit breaker includes a mechanical switch configured to place the breaker in or out of the power distribution system in the event manual control of the circuit breaker is needed to bypass the solid state circuit breaker. The circuit breaker 102A is shown as being connected to a facility circuit 128. While not illustrated, the remaining circuit breakers 102 are also coupled to the facility circuit.

A communication device 130 is operatively connected to the cloud based server 106 through a wireless or wired communication link, as is understood by those skilled in the art. The communication device 130, in different embodiments, includes but is not limited to, a smart phone, a cell phone, a mobile phone, a tablet device, a desktop computer, a laptop computer, or other communication device configured to communicate with the internet serve 106. The communication device supports the use of a software application, also known as an "app" which communicates with the controller 112. The applications are stand-alone software applications that run on the communication device 130.

The applications described herein can be embodied as program code in software and/or firmware resident in one or communication devices 130. In other embodiments, the applications are located on the cloud server 106 or at the controller 112. The communication device, in different embodiments, includes application programming interfaces (APIs). The communication device provides for bi-directional communication over communication protocols including Bluetooth, Wi-Fi, NFC, ethernet, and/or 3G communication networks or 4G communication networks.

Figure 2:
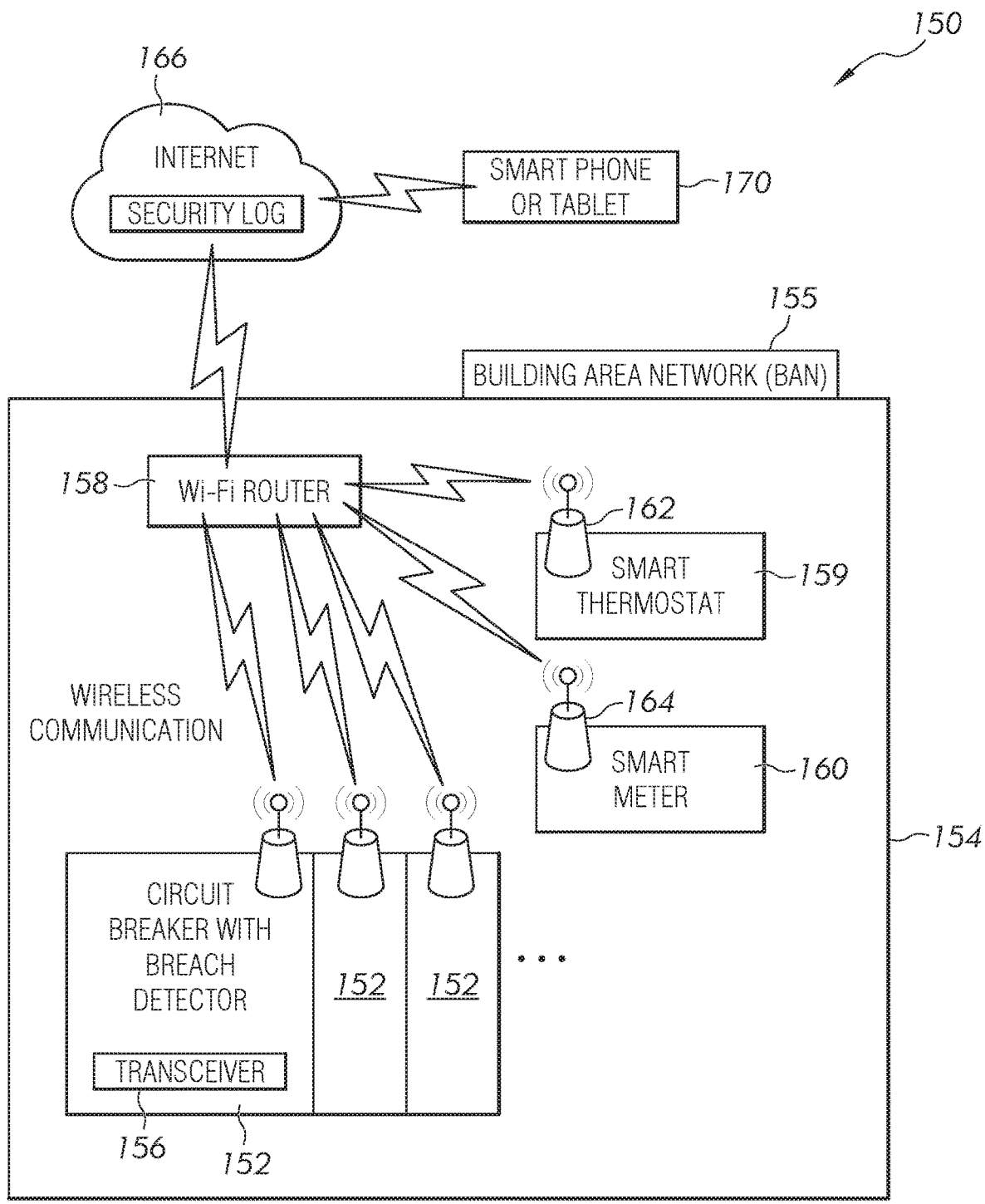
FIG. 2 illustrates a schematic block diagram of another embodiment of an electrical power management system having tamper detection and mitigation for resolving a breach to one or more circuit breakers.

FIG. 2 illustrates a schematic block diagram of another embodiment of an electrical power management system 150 having tamper detection and mitigation for resolving a breach to one or more circuit breakers 152 located at a facility 154. The facility 154 includes an area network 155, which in different embodiments is a wireless network, a wired network, or a combination of the two. In this embodiment, each of the circuit breakers 152 includes a transceiver 156 that wirelessly communicates with a Wi-Fi router 158. In addition to the circuit breakers 152, the facility includes a smart thermostat 159 and a smart meter 160. Both the smart thermostat 159 and the smart meter 160 include respectively a transceiver 162 and 164 to wirelessly communicate with the router 158. The smart meter 160 records data representing energy consumed in the facility 154 and provides the recorded data through the router 158 either continuously or at the request of a user of the smart meter 160. As described above, the circuit breakers 152 includes solid state circuit breakers, mechanical circuit breakers with control circuitry, or a combination of both.

The power management system 150 provides for control of each of the circuit breakers 152 through the use of cloud based communication which includes a "cloud" based server 166, having an internal or external memory. In this embodiment, the "cloud" communicates with the router 158, which in turn communicates with each of transceivers 156 of each of the circuit breakers 152 as well as communicating wirelessly with the smart thermostat 159 and the smart meter 160. In this embodiment, the communication system is completely wireless, although in other embodiments a combination of wireless and wired communication or wired only communication is contemplated.

A communication device 170 is operatively connected to the cloud based server 166 through a wireless or wired communication link, as is understood by those skilled in the art. The communication device 170 is configured as previously described for the device 130 although the communication device 170 supports additional features not found in the communication device 130 though a stand-alone software application configured to receive and transmit data to the smart meter 160. In other embodiments, including the embodiment of FIG. 1, the applications are configured to receive and to transmit data to and from a power management system to provide for monitoring and control of the power management system including the circuit breakers and these and other smart devices.

Figure 3:
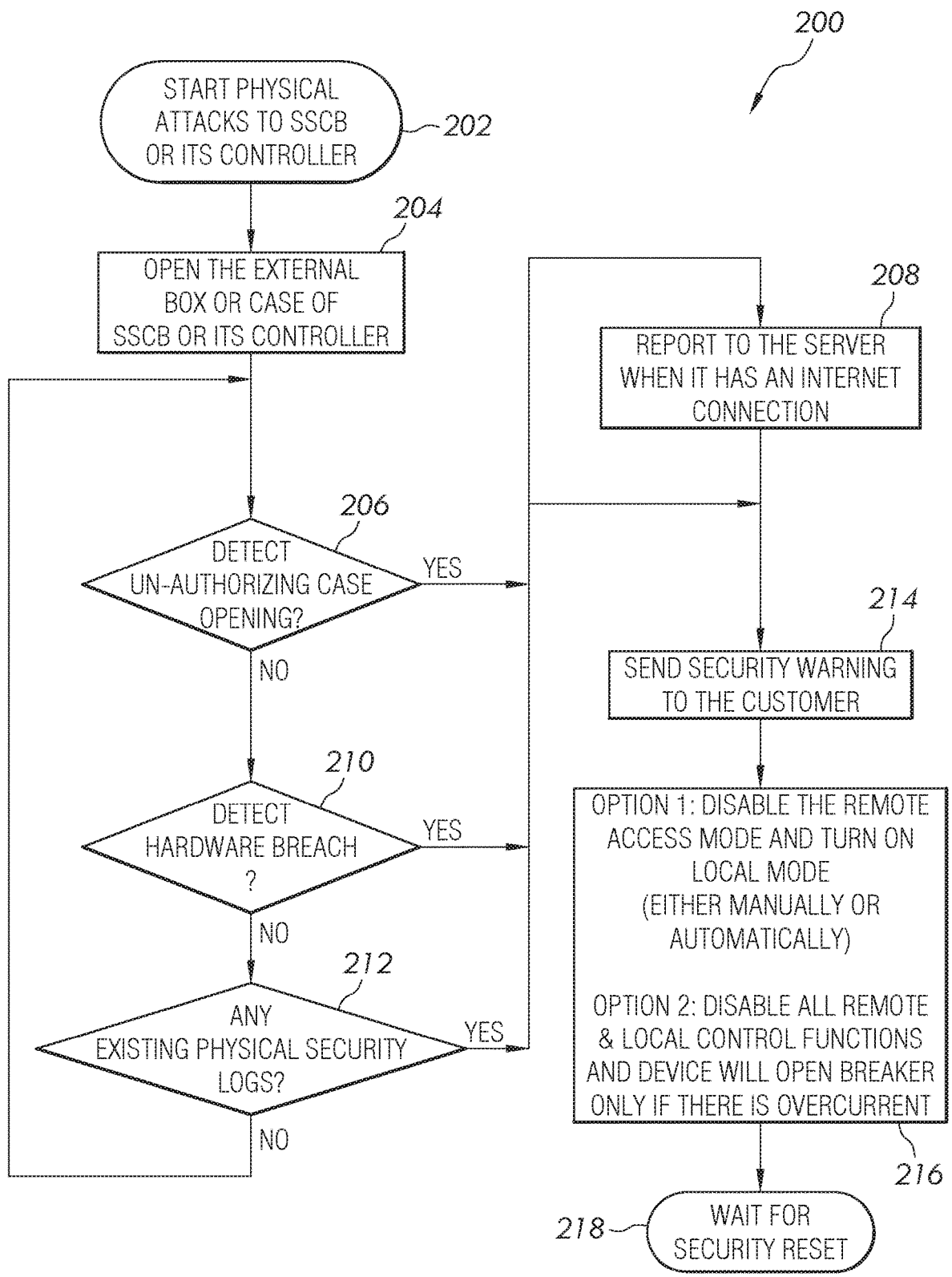
FIG. 3 is a block diagram of a process of detecting and mitigating a breach to a circuit breaker device.

FIG. 3 illustrates a block diagram 200 of a process of detecting and mitigating a breach to a circuit breaker device. In particular, FIG. 3 illustrates an attempt to breach or tamper with a circuit breaker resulting from a physical breach, such as the opening of a housing of the circuit breaker or an electrical breach to the electrical circuitry of the circuit breaker device. The process provides for a hardware tamper detection reporting for the circuit breaker, such as occurring at the RCCB and the included controller, in order to prevent the unwanted circuit breaker opening or closing attacks by an unauthorized entity or individual. The attempt at a breach can occur once the circuit breaker is installed or can even be made the first time installation of circuit breaker and controller is made by an installer.

At block 202, a physical attack to a circuit breaker of the electrical circuitry is made by an unauthorized entity or individual. During this attack, an attempt to open the housing of the circuit breaker is made at block 204, which is detected by the hardware and circuit breach detector 124. At block 204, other types of breaches can occur, including a breach to the circuit breaker circuitry including a controller located within the housing. In the event of a physical breach, the sensor located at the circuit breaker detects the unauthorized opening of the housing at block 206. If the sensor detects a breach to the housing, the sensor provides a signal to the router which is transmitted to the server at block 208.

If there is no detected opening of the housing, the system continues to monitor for a hardware tampering attack. If a breach of the electrical hardware is detected at block 210, the breach detector provides a signal to the router which is transmitted to the server at block 208. In other types of tampering, hardware probing, lifting of signal traces, and power supply alterations can occur and are detected.

If there is no hardware breach at block 210, the system determines whether there are any existing physical security logs at block 212. If there are none, the system returns to block 206 to provide for further detection of unauthorized housing opening or electrical hardware breach. If there is an existing physical log, the existence is reported to the server through a communication channel, such as through the described internet connection.

Security data logs are generated and maintained by the user application or by other software instructions which provide for maintaining a record of an un-authorized case opening attack and/or hardware tampering attack. The security data logs, in different embodiments, are maintained and located at a user's facility, a manufacturer's facility, an installer's facility, a distributor's facility, of a seller's facility. In other embodiments, the security log is stored at the memory found in the cloud 166, for instance, or in a memory of the mobile device 170. The security logs are maintained in memory and accessible as understood by those skilled in the art. Registration by a customer of having an installed device, in some embodiments, initiates the formation of a log. The log also enables a subsequent purchaser of the devices or the facility in which the devices are located to know the occurrences of tampering. Such a log can provide needed information to a new user if the prior user did not overcome the attempts at tampering or made changes to the devices to be able to control the RCCBs of the subsequent user. The security logs include, but are not limited to, information identifying the user of the circuit breaker, the identity of the circuit breaker, the location of the circuit breaker, the occurrence of a breach event, and the date of the occurrence of the breach attempt. If there is a security event (breach event), the circuit breaker and the associated controller report event to the server when internet connection is available. This will enable the manufacture to trace the security status of each device. In the event of a security event, the current user will receive the warning with detailed information identifying the event.

In addition to making a report of the occurrence of a breach at block 208, at the same time when the detection of a physical or electrical breach is made, a security warning is transmitted to the customer at block 214. The customer is, in different embodiments however, not the only person or entity to which the security warning is sent. In this and other embodiments, the security warning is sent to one, some of, or all of the manufacturer of the circuit breaker device, an installer of the circuit breaker device, and a user of the circuit breaker device.

Once or at about the same time the security warning is sent, the affected circuit breaker is disabled at block 216. Block 216 illustrates two different options of disabling the affected circuit breaker. In option 1, the remote access mode of the circuit breaker is disabled and the local access mode is authorized. The local access mode, in different embodiments, is either made manually at the circuit breaker itself or is made automatically in the event a breach is detected. For instance in the event of a detected breach, the circuit breaker controller is configured to immediately disable remote access and to set the circuit breaker to one of the manual or automatic local modes. In option 2, all remote and local control functions are disabled. In local mode, the user, or other authorized person or entity, is authorized to control the operation of the circuit breaker by manual operations such as pressing a local switch or button or moving a toggle. If the user enables the local mode function locally, the remote access function is also disabled, so that external control of the circuit breaker cannot be made to the circuit breaker by electronic communication. The user, under some conditions, may desire to fix or disable the security warnings. In this event, the user can contact to the manufacture for the more details, so the online reset mode can be re-activated via manufacture after investigation.

This invention proposes a method and system for a hardware temper detection reporting for circuit breakers, including SSCBs, and the controller in order to prevent the unwanted circuit breaker opening or closing attacks by an attacker. The proposed invention also has a capability to disable the remote control function (i.e., change from remote access mode to local mode) of the circuit breaker and its controller when there is any attempts to access to hardware or any existing history of physical attacks. Once circuit breaker or its controller is in local mode, users can control the circuit breaker only via the manual action (e.g., local push switch or button for manual operations).

The present disclosure, is however, not limited to these two options, and other options are contemplated. For instance in one configuration, the disabling of the circuit breaker is made remotely by instructions provided by a user using the communication device. In this configuration, the security warning is sent at block 214, a recipient of the warning is alerted, and the recipient determines whether to disable the affected circuit breaker or any other circuit breakers. For instance, if the facility includes a master circuit breaker controlling the delivery of power to a number of other circuit breakers, the recipient's decision includes disabling only the affected circuit breaker or disabling the master circuit breaker. Since each of the circuit breakers is controllable through the communication network, any one, some of, or all of the circuit breakers are defeatable with a transmitted signal.

Once a circuit breaker has been disabled, the system waits for a reset of the affected device at block 218. The reset, in different embodiments is made by one, some of, or all of the manufacturer of the circuit breaker device, an installer of the circuit breaker device, and a user of the circuit breaker device.

The present disclosure monitors, saves a data log, and provides alarms for malicious physical activities and attacks on the RCCB or the controller. In addition, the detection and identification of the harmful, false, or unauthorized activities made by a previous owner, contracted engineer, or an attacker is provided. Deactivation of remote access monitoring, remote activation, and other control function in the event of new detected physical attack attempts are also provided. Continuous and ongoing situational awareness of the physical security of the circuit breaker and controller is included as well as blocking and reporting malicious or bad activities of hardware tempering attacks.

The present disclosure is not limited to the type of circuit breaker and is also not limited to the type of SSCB. Any SSCB that provides over current protection using solid state switching devices including as IGBT, IGCT, MOSFET, SiC switching devices are contemplated. When the over current flows, the current sensing unit detects the overcurrent and sends the over current detection signal to the controller located inside or outside the SSBC, and then the controller sends an open signal (electrical signal) to the solid state switching device. Thus, the on and off control of the SSCB is performed by an electric signal and is controllable by electrical signal communication. In some types of SSCB device, no additional internal electrical circuit components are required.

It shall be appreciated that a number of variations and modifications to process 200 is contemplated including, for example, the omission of one or more aspects of process 200, or the addition of further conditionals and operations and/or the reorganization or separation of operations and conditionals into separate processes.

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with or a connection to another item as well as a belonging to or a connection with the other item as informed by the context in which it is used. The terms "coupled to", "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. A method of detecting and mitigating a breach to a circuit breaker device having a housing, an electrical circuit, and switch coupled to and controllable by the electrical circuit, the method comprising:
    evaluating a plurality of breach event indicators including (a) an indicator of a first type of breach event indicating a breach of the housing and (b) an indicator of a second type of breach event indicating a breach of a circuit board;
    in response to an affirmative evaluation of any of the plurality of breach event indicators, detecting a breach event;
    generating an alert identifying the detected breach event;
    transmitting the alert to a computing device; and
    disabling a remote access capability of the circuit breaker in response to the breach event.

2. The method of claim 1 wherein the plurality of breach event indicators includes an indicator of a third type of breach event indicating a software breach.

3. The method of claim 2 wherein the generating the alert includes generating an electrical signal configured to identify the type of access event.

4. The method of claim 3 wherein the transmitting the alert includes transmitting the alert through a wired communication or a wireless communication.

5. The method of claim 4 further comprising responding to the transmitted alert by transmitting a control signal to the electrical circuit of the circuit breaker device through the wired communication or the wireless communication.

6. The method of claim 5 wherein the transmitting an alert includes transmitting the alert to a computing device of one of a manufacturer of the circuit breaker device, an installer of the circuit breaker device, and a user of the circuit breaker device.

7. The method of claim 1 wherein the circuit breaker device includes one of a mechanical circuit breaker, a solid state circuit breaker, and a combined mechanical and solid state circuit breaker.

8. The method of claim 1 wherein the indicator of the first type of breach event indicates that an un-authorized housing opening has occurred.

9. A method of detecting and mitigating a breach to one of a plurality of circuit breaker devices of an electrical power management system, wherein each of the plurality of circuit breaker devices includes a housing, an electrical circuit, and switch coupled to and controllable by the electrical circuit, the method comprising:
    evaluating a plurality of breach event indicators including (a) a first type of breach indicator indicating a housing breach and (b) a second type of breach indicator indicating a circuit board breach;
    in response to an affirmative evaluation of any of the plurality of breach event indicators, detecting a breach event;
    generating an alert identifying the one of the plurality of circuit breaker devices experiencing the detected breach event;
    transmitting the generated alert by a wireless communication link to a computing device; and
    disabling a remote access capability of the one of the plurality of circuit breaker devices experiencing the detected breach event.

10. The method of claim 9 further comprising receiving from the computing device an instruction to disable the one of the plurality of circuit breaker devices by one of: i) disabling a remote access mode of the circuit breaker; and ii) determining a local access mode of the circuit breaker.

11. The method of claim 10 wherein the disabling the one of the plurality of circuit breaker devices includes disabling the remote access mode of the one circuit breaker.

12. The method of claim 9 wherein the disabling the one of the plurality of circuit breaker devices includes disabling a remote access mode and enabling a local access mode of the circuit breaker.

13. The method of claim 9 wherein the disabling the one of the plurality of circuit breaker devices includes disabling both a remote access mode and a local access mode and wherein the circuit breaker operates only in the event of an overcurrent condition.

14. The method of claim 9 wherein the plurality of breach event indicators includes an indicator of a software breach.

15. An electrical power management system comprising:
    a plurality of circuit breakers, wherein each of the circuit breakers includes a housing, an electrical circuit, a breach detector coupled to the electrical circuit to detect a breach event of the respective circuit breaker, and a switch coupled to and controllable by the electrical circuit;
    a communication line operatively connected to each of the electrical circuits of each of the plurality of circuit breakers;
    a circuit breaker controller, operatively connected to the communication line; and
    a network communication router, operatively connected to the communication line and adapted to communicate with an internet based computing service;
    wherein the breach detector is adapted to
    evaluate a plurality of breach event indicators including (a) a housing breach indicator indicating a housing breach and (b) a circuit board breach indicator indicating a circuit board breach, and
    in response to an affirmative evaluation of any of the plurality of breach event indicators, detect a breach event.

16. The electrical power management system of claim 15 wherein each of the plurality of circuit breakers includes one of a mechanical circuit breaker, a solid state circuit breaker, and a combined mechanical and solid state circuit breaker.

17. The electrical power management system of claim 16 wherein the breach detector is adapted to:
    generate an alert configured to identify the detected breach event.

18. The electrical power management system of claim 17 wherein the circuit breaker controller includes a processor and a memory configured to store program instructions, the circuit breaker controller configured to execute stored program instructions to:
    determine the generation of the alert;
    determine the identity of the circuit breaker having the detected breach event; and
    provide an identifier of the determined identity of the circuit breaker having the detected breach event; and
    transmit the identifier to the network communication router.

19. The electrical power management system of claim 18 wherein the electrical circuit of each of the circuit breakers is adapted to adjust an operating condition of the switch in response to the circuit breaker controller.

20. The electrical power management system of claim 19 wherein the circuit breaker controller is further configured to executed stored program instructions to:
    disable operation of the switch of the circuit breaker having the detected breach event.

21. The electrical power management system of claim 20 wherein the circuit breaker controller is further configured to execute stored program instructions to:
    disable operation of the circuit breaker having the detected breach event in response to a manual attempt change a status of the switch.

22. The electrical power management system of claim 21 wherein the circuit breaker controller comprises a system circuit breaker controller operatively connected to each of the plurality of circuit breakers.

23. The electrical power management system of claim 21 wherein the circuit breaker controller comprises a plurality of circuit breaker controllers, wherein each one of the plurality of circuit breakers includes one of the plurality of circuit breaker controllers.

24. The system of claim 15 wherein the plurality of breach event indicators includes software breach indicator.

* * * * *